United States Patent
Bhambare et al.

(10) Patent No.: US 12,377,709 B2
(45) Date of Patent: Aug. 5, 2025

(54) AUTOMATIC ORIENTATION OF HVAC AIR VENTS TO OCCUPANT

(71) Applicant: Rivian IP Holdings, LLC, Irvine, CA (US)

(72) Inventors: Kamalesh Bhambare, Novi, MI (US); Danny Jierian, Diamond Bar, CA (US); Graham Lloyd Feltham, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 531 days.

(21) Appl. No.: 17/718,916

(22) Filed: Apr. 12, 2022

(65) Prior Publication Data

US 2023/0322043 A1    Oct. 12, 2023

(51) Int. Cl.
*B60H 1/00* (2006.01)
*B60H 1/34* (2006.01)

(52) U.S. Cl.
CPC ..... *B60H 1/00742* (2013.01); *B60H 1/00792* (2013.01); *B60H 1/00871* (2013.01); *B60H 1/00971* (2013.01); *B60H 1/3414* (2013.01)

(58) Field of Classification Search
CPC ............ B60H 1/00742; B60H 1/00792; B60H 1/00871; B60H 1/00971; B60H 1/3414; B60K 35/10; B60K 35/22
USPC ........................................................ 454/152
See application file for complete search history.

(56) References Cited

U.S. PATENT DOCUMENTS

| | | | |
|---|---|---|---|
| 11,091,009 B2 | 8/2021 | Skapof et al. | |
| 2013/0344791 A1* | 12/2013 | Wang ................. | B60H 1/00871 454/155 |
| 2015/0328958 A1* | 11/2015 | Winget, Jr. ........ | B60H 1/00742 454/155 |
| 2021/0394584 A1* | 12/2021 | De Pelsemaeker .... | B60H 1/345 |

* cited by examiner

*Primary Examiner* — Steven B McAllister
*Assistant Examiner* — Charles R Brawner
(74) *Attorney, Agent, or Firm* — Haley Guiliano LLP

(57) ABSTRACT

A system and method are provided for an air vent system in, for example, a vehicle. The air vent system is configured to direct air flow to a point relative to a user's position in the vehicle. A camera may capture a view of the user and processing circuitry may analyze the captured information to determine a position of the user in the vehicle and control the direction of air flow based on the determined position of the user.

17 Claims, 8 Drawing Sheets

AUTOMATIC ORIENTATION OF HVAC AIR VENTS TO OCCUPANT

INTRODUCTION

The present disclosure is directed to an improved ventilation (e.g., cooling and/or heating) system. In particular, systems and methods are provided for automatically positioning the vents of a vehicle without manual control of the vents by a driver.

SUMMARY

Some vehicles include manually operable vents for the ventilation system (e.g., heating or cooling system). The vents typically include fins which a user must manually adjust to achieve the desired air flow position. However, constantly readjusting the fins of the vents is burdensome and impractical for a user who is otherwise occupied with driving a vehicle. For example, to manually reach some vents, the user would have to take his or her hand off the steering wheel. Furthermore, the fact that fins of the vents must be reachable by the driver, limits the possible locations of vents to reachable areas of the vehicle (e.g., to certain parts of the instrument panel). Limited location and rushed positioning can lead the driver to settle on a less than optimal air flow position, too. Consequently, what is needed is a system for automatically controlling airflow of the vehicle vents with little to no input from the user. In particular a system is needed that would quickly and accurately position the airflow of the vehicle.

In accordance with the present disclosure, systems and methods are provided that improve the operation of a ventilation system of a vehicle. A vehicle may include one or more air vents, each including at least one controllable feature (e.g., a fin, spout, or other mechanism for directing air flow). For example, each fin may be controllable by at least one motor and/or actuator to change its position as to control the flow of air in a selectable direction. For example, each vent may have an actuator for controlling horizontal orientation of the fins, and an actuator for controlling vertical orientation of the fins. Each vent may also include an actuator-controllable valve for selectable adjustments of the intensity of the airflow through that vent. Advantageously, in some embodiments, control of the fins and valves by the motor or actuator allows the direction and intensity of air flow to be changed without requiring the user of the vehicle to manually adjust the fins and/or valves of the vents.

In some embodiments, instead of the manual control, the fins and/or valves may be controlled by processing circuitry of the vehicle based on input informing the processing circuitry of the position of the user. For example, in some embodiments, the system may include a camera to capture an image of the user and a computer vision algorithm to determine the location of the user within the vehicle. In some embodiments, the processing circuitry may receive input regarding the position of the user's seat in the vehicle to determine the location of the user. Once the location of the user is determined, the processing circuitry may use the motor or actuator to adjust positions of the fins to direct airflow of the vents to the user or a location in the vehicle that the user has chosen.

For example, the system may include a display that offers air vent position options to the user. The options may include, for example, body parts such as neck, face, or chest. The user may then select a preferred option. In response to the selection, the system may adjust the vents (via motors or actuators) to direct airflow to the location in the vehicle corresponding to the selected preference. For example, the system may direct airflow to a user's chest if the user has selected the chest option.

In some embodiments, the user may input several consecutive selections. For example, the user may choose head and then chest. In response, the system adjusts the vents based on the selections. For example, the system may, automatically, direct the air to head and then after some period of time (e.g., sequentially) direct the air to the chest. In some embodiments, the selection of the temperature and airflow intensity may be selected sequentially as well. In this case, the system may change the temperature and airflow intensity in the selected sequential order. Alternatively, the system may detect temperature and automatically adjust the temperature of the airflow based on information it has received.

In some embodiments, the system may store a selection as a saved user profile to avoid a user inputting a series of preferences more than once. In this case, the user may choose one option to instruct the system to adjust the vents in a particular, personalized manner. For example, if a user who usually selects the head and then the chest and saves this option as his or her profile, the system may automatically change the position of the vents to the head and then chest when that profile is selected without any further input.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

The present disclosure is directed to methods and systems for an air vent system of a vehicle. These systems and methods direct ventilation in the vehicle to a user preference by locating the user within the vehicle and without the need for the user manually positioning the ventilation.

In some embodiments, the air vent system, or ventilation system of a vehicle, may include at least one air vent, otherwise known as, and used interchangeably with, the term vane, (e.g., air vents 210, 220, 230, 240 of FIG. 2) which provides conditioned or heated air to a user. In some embodiments, each or some air vents of air vents 210-240 may include one or more controllable features 210*b*, 220*b* such as fins, spouts, grills, or other mechanisms for directing air flow, which may be moved (e.g., rotated or translated) via at least one motor or actuator. In some embodiments, a single motor can control both vertical and horizontal orientation of the fins or other controllable features. In some embodiments, one motor may control horizontal orientation of the fins, while another motor may control vertical orientation of the fins. In some embodiments, fins of the vent can be oriented to direct air from the vent in any suitable direction inside the vehicle.

In some embodiments, the vehicle ventilation system may include processing circuitry coupled to the air vent system that is capable of interfacing with a display and with a vent controller, and that can configure the controllable features 210*b*, 220*b* of air vents 210-240 of the vehicle (e.g., by actuating at least one motor). In some embodiments, the processing circuitry may be capable of configuring the plurality of controllable features such that the vent directs air to a location that corresponds to the selected preference. Information regarding the location of the selected preference may be determined based on information collected from a camera, a computer vision algorithm, and seat position. For example, if the user 250 of FIG. 2 has selected to direct air to the chest of the driver via the interface, the processing circuitry use at least one motor to move controllable features 210*b*, 220*b* such that the vent directs the air to the chest of the driver. In some embodiments, some or all of vents 210-240 that are controlled by processing circuitry may lack any kind of manual control of the controllable features 210*b*, 220*b* (e.g., the fins may be concealed behind the faceplate of the vent.) This allows vents 210-240 to be placed in any location of the vehicle, even where it is not reachable by the driver or passengers.

Figure 2:
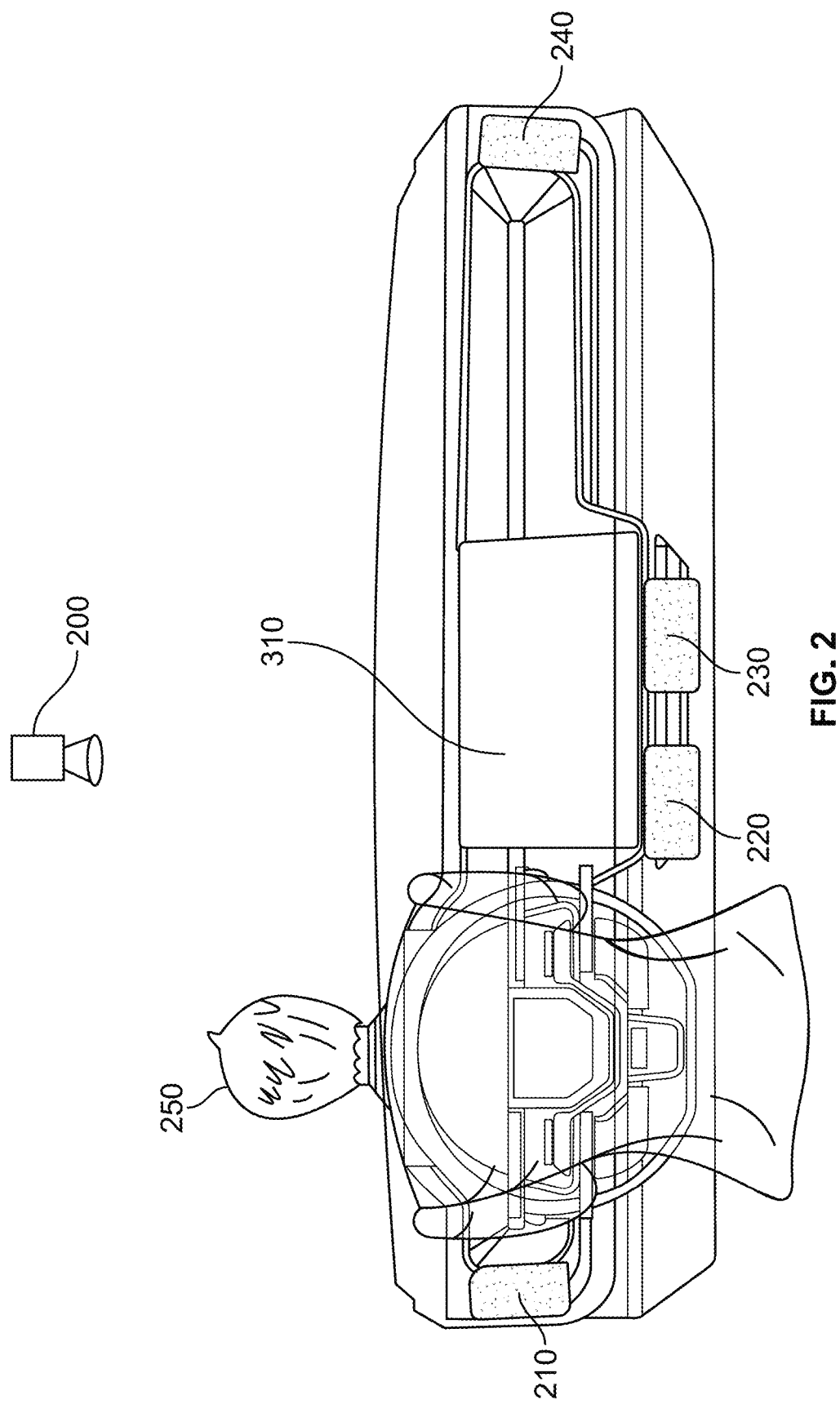
FIG. 2 shows an illustration of a front view of a dashboard of a vehicle with a user at the steering wheel, in accordance with some embodiments of the present disclosure.

In some embodiments the vehicle includes one or more internal cameras 200 of FIG. 2 capable of receiving captured images of the driver or other passengers. In some embodiments, a computer vision algorithm processes the images of the camera 200. In some embodiments the computer vision algorithm identifies the user or user's body parts. The computer vision algorithm in some embodiments recognizes the position of a user or specific body parts (i.e., ears, neck, or chest) of the user 250 within the vehicle based on the captured image or images. For example, the computer vision algorithm may recognize the outline of a person in a seat in a vehicle. It may also use image recognition software to recognize a face within the vehicle by locating eyes or other facial features. Once it has recognized a face, it may use that information to find the user's head, neck, or other body parts.

In some embodiments the camera 200 may further capture images of the windows or windshield to determine whether or not the windows are fogged and if defrosting the windows in necessary.

Figure 3:
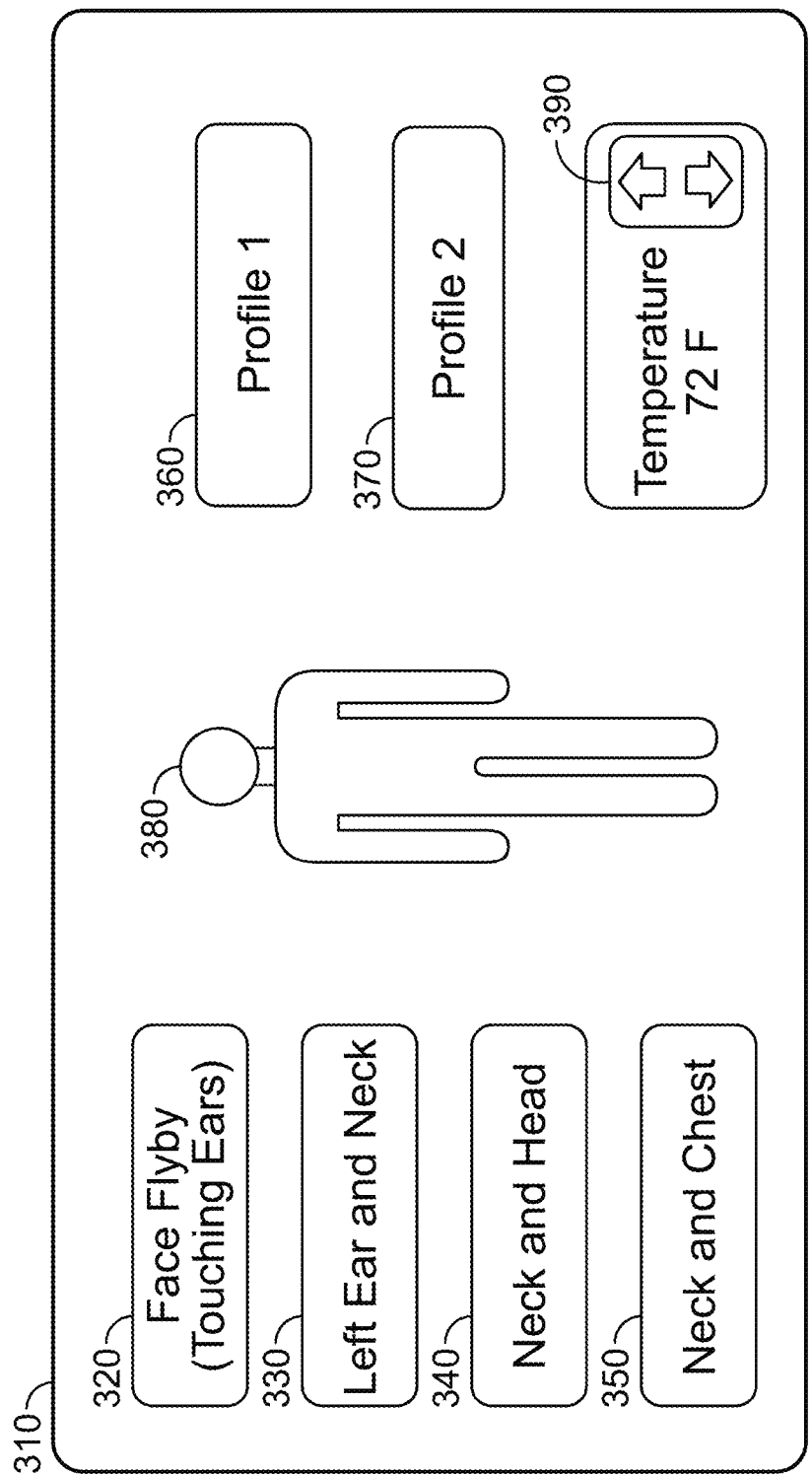
FIG. 3 shows an illustration of a display of a vehicle, in accordance with some embodiments of the present disclosure.

In some embodiments, the vehicle ventilation system may include a display such as a touch screen display 310 of FIG. 3 or another type of a user interface. In some embodiments, the touch screen may display an object to assist a user in directing the air flow of air vents 210-240. For example, the touch screen may display icons representing different preferences for air flow for the user to choose from. Some embodiments may include other user interface and displays. In some embodiments the display includes an option to adjust temperature.

In some embodiments, users, either the driver or passengers, will have general air flow preferences, such as the preference to focus air flow through the center of the vehicle using the center most vents 210. In some embodiments, users will prefer that the air flow is directed to a specific location within the vehicle relative to the user's position. For example, a user 250 might prefer that air is directed at his or her face. Another user might prefer that the air flow avoid his or her eyes. Another still might prefer the air flow to be at his or her sides but not directly on the user. In some embodiments a user may select a preference from the display 310 of FIG. 3 that best matches his or her own preference. In some embodiments, a number of preferences may be available to a user 250. In some embodiments, preferences may be a specific body part (i.e., neck, ears, or chest). In some embodiments a preference may be a style such as fly by, in which the air flows next to the user's face or body but does not directly touch the face or body. In some embodiments a user may choose more than one preference (e.g., neck and chest and fly by). In some embodiments a user may save his or her chosen preferences as a saved user profile, which applies the selected options without requiring the user to select his or her preferences again. In some embodiments a user 250 may direct air flow by voice command and may reference a specific body part. For example, in vehicles using Amazon Alexa, a user 250 may direct air flow to his or her ears by saying, "Alexa, send airflow to my ears." To match these preferences accurately relative to the user, the direction of air flow can be determined specifically for every user.

User positioning in a vehicle varies widely based on the size and shape of the individual as well as his or her position and posture in the vehicle. For example, it is common for a husband and wife to share a vehicle where the husband and wife are different heights and may have different airflow preferences. Vents set to direct air to the face of a shorter person sitting far back from the steering wheel might only reach the chest of a taller person sitting close to the steering wheel. Similarly, a person who begins his or her drive with straight posture might slouch and lean on one side after several hours in the car, thereby moving the position of his or her body. That person might further reposition the seat, moving his or her body yet again. While the vents 210-240 might be properly set for that person initially, after several hours, his or her body has moved and the vents 210-240 will no longer align with their intended target. Given this wide range of variation, in some embodiments it is important that any targeted direction of the vents relative to the user's position be customized to that specific user.

In some embodiments identifying the position of the user may use information or images collected from the camera 200 and processed by the computer vision algorithm. In some embodiments identifying the position of the user may comprise using information or images collected from the camera 200 and processed by the computer vision algorithm to identify the user. In some embodiments, identifying the user in the collected images comprises identifying a body part of the user in the images. In some embodiments the system may direct the vents 210-240 according to the information or images collected from the camera 200 and processed by the computer vision algorithm. In some of these embodiments, the images from the camera 200 and their processing via the computer vision algorithm can inform the ventilation system of the position of the user 250. As described above, the computer vision algorithm may, for example, use images to create an outline of the user or find the user's face within the vehicle. Using this information, the system may then find the relevant body parts. Once the positions of the relevant body parts are determined, the system may then direct the vent 210 in the appropriate direction. For example, if a user 250 wants air on his or her cheeks, and chooses from the display an option for air directed at his or her face, the system may capture an image of the user 250 using the camera, process that image, and determine the position of the user's face within the vehicle. It may then direct air to the user's face, or the position of the face, as requested.

In some embodiments, the system may also determine the position of the user 250 in part based on the position of his or her seat in the vehicle. In some embodiments, the position of the seat is digitally controlled. In some embodiments, the system may collect and relay information regarding the position of the seat to the processing circuitry, where the information is considered in determining the position of the user 250. For example, the system may rely primarily on the image of the user 250 captured by the camera. However, the camera may not accurately account for depth. The camera may capture an image of a user in a position wherein the user is in a specific location in the image. Another user farther back in position and having a different height than the first user could be in the same sightline of the camera. For example, a shorter user sitting further back from a tall user could appear in the same location in the image the camera 200 captured. To the camera these two users may appear in the same position despite being in different positions. In such scenarios, embodiments of the disclosure may consider the seat position of the user to assist in determining the position of the user within the vehicle. In some embodiments the system estimates where the user is based on a typical position of a seat.

A display 310 may be presented to a user 250 in one embodiment. In some embodiments, the display 310 may be configured to receive one or more user inputs including selections of preferences from an object displayed on the touch screen. The display 310 can present various presets to the user for the user to select, such as: fly-by, left ear and neck, head and neck, and neck and chest, and saved user profiles 1 and 2. The user may choose one or a combination of these options that describe his or her preferences for air flow direction. Once chosen, the processing circuitry of the system may configure the plurality of controllable features 210*b*,220*b* of some or all vents 210-240 based on the selections of the user. In some embodiments the processing circuitry may rely on information from a camera 200 to determine a location within the vehicle that corresponds to the chosen selection. In some embodiments, information from a camera 200 is processed using a computer vision algorithm. For example, the processing circuitry may determine the position of the head and neck of a user based on images from the camera 200 and configure the controllable features to direct air to the neck and head of a user when a user has selected the "neck and head" preset from the display. As another example, the processing circuitry may configure controllable feature of several of the vents 210-240 to simultaneously direct air to the selected position. In some embodiments the processing circuitry may direct air to the windows or windshield to defrost the glass when it has become fogged. In some embodiments, the airflow may be directly automatically with no input from the user 250. For example, the processing circuitry may direct the vents to the chest of every driver or passenger whenever an image from the camera 200 informs the system that a driver or passenger is present in the vehicle. In some embodiments, the user may further customize the air flow. For example, once the processing circuitry has set the controllable feature 210*b*, 220*b*, the user may communicate to the processing circuitry via a display, that the processing circuitry should raise or lower the vent positions. In some embodiments, the processing circuitry adjusts the vent position via the controllable feature 210*b*, 220*b* to maintain the user selection as the user adjusts his or her own position within the vehicle.

Figure 1:
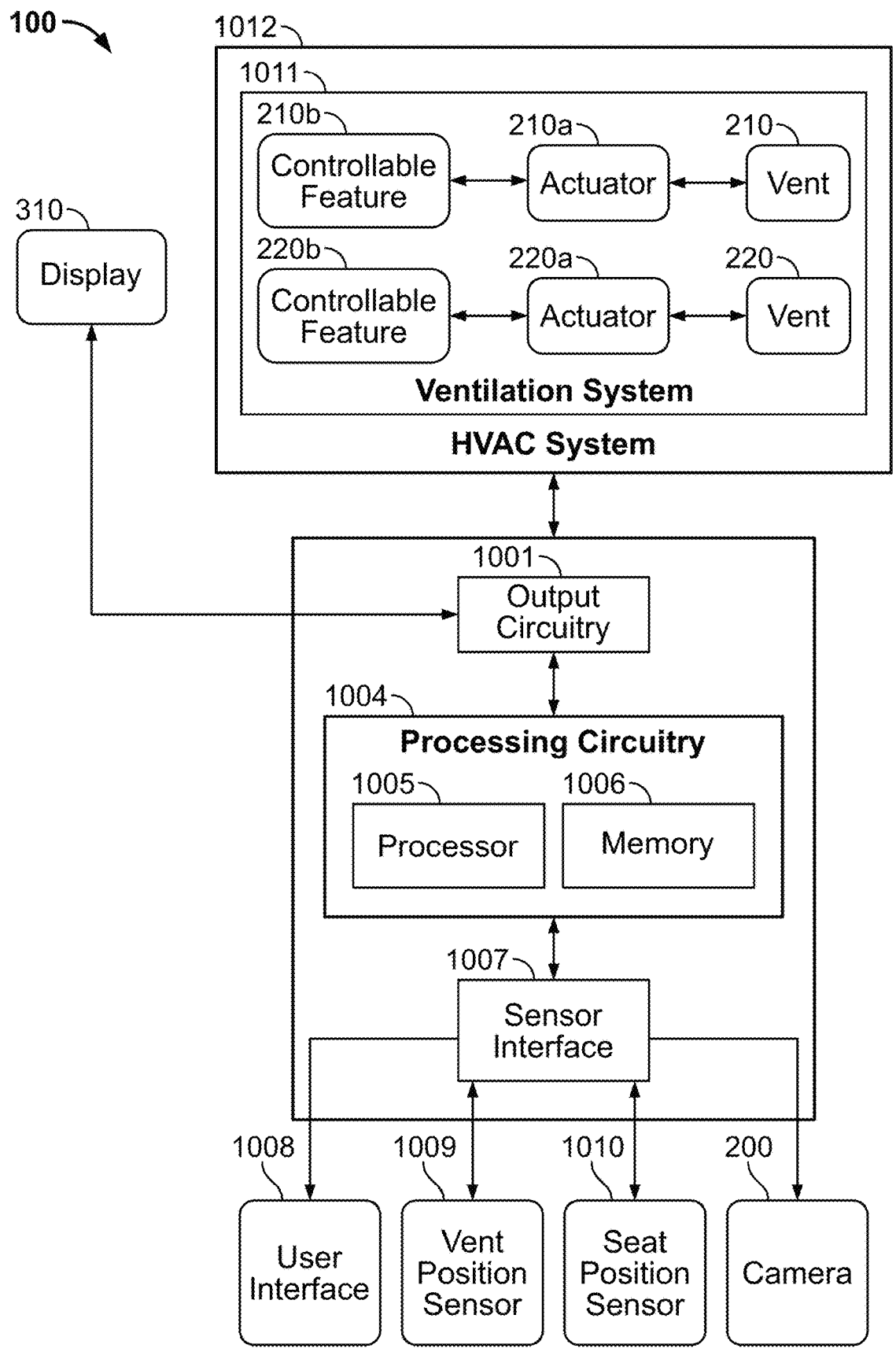
FIG. 1 shows a block diagram of components of a ventilation system, in accordance with some embodiments of the present disclosure.

FIG. 1 shows a block diagram of components of a ventilation system 100 of a vehicle, in accordance with some embodiments of the present disclosure. In some embodiments, system 100 may include processor 1005. Processor 1005 may comprise a hardware CPU for executing commands stored in memory 1006 or software modules, or a combination thereof. In some embodiments, processor 1005 and memory 1006, in combination, may be referred to as processing circuitry 1004 of system 100. In some embodiments, processor 1005 alone may be referred to as processing circuitry 1004 of system 100.

In some embodiments, system 100 may include memory 1006. In some embodiments, memory 1006 may include hardware elements for non-transitory storage of commands or instructions, that, when executed by processor 1005, cause processor 1005 to operate system 100 in accordance with embodiments described above and below.

In some embodiments, processing circuitry 1004 may be communicatively connected (e.g., via a sensor interface 1007) to camera 200. In some embodiments, camera 200 may be controlled via directions from processing circuitry 1004. Information from the camera 200, such as image data, may be processed by a computer vision algorithm implemented on processing circuitry 1004.

In some embodiments processing circuitry 1004 may be communicatively connected to display 310 via, for example, output circuitry 1001. In some embodiments display 310 provides a user interface for displaying information. In some embodiments display 310 may be for example a touch screen display and may receive input from the user 250 as well.

In some embodiments, processing circuitry 1004 may be communicatively connected to the controllable feature of the vents 210*b*, 220*b*, for example vents 210 and 220, through connection to the vent motor or actuator 210*a* and 220*a*. Vents 210 and 220 may each be controllable by motor and/or actuator 210*a* and 220*a* to change position as to control the flow of air in a selectable direction. Vent systems and controls are described in greater detail in commonly assigned Skapof et al. U.S. Pat. No. 11,091,009, issued Aug. 17, 2021, which is hereby incorporated by reference herein in its entirety. The vents 210 and 220 may be part of a ventilation system 1011 which is part of the vehicle's HVAC system 1012. Ventilation system 1011 and HVAC system 1012 may include additional vents, such as vents 230 and 240 seen in FIG. 2, that are controlled similarly to vents 210 and 220. The vents 210 and 220 may be used to direct air according to user's preferences. For example, processing circuitry 1004 may use information received from camera 200, vent position sensor 1009, and seat position sensor 1010 to determine where to direct vents 210 and 220.

In some embodiments processing circuitry 1004 may be communicatively connected to user interface 1008, for example via sensor interface 1007. User interface 1008 may receive instructions from the user 250 such as selections chosen via display 310. In some embodiments processing circuitry 1004 may be communicatively connected to vent position sensor 1009, for example via sensor interface 1007. Vent position sensor may collect data used to determine the position of a vent, such as vent 210, so that the vent may be repositioned according to received input from the user 250. In some embodiments processing circuitry 1004 may be communicatively connected to seat position sensor 1010, for example via sensor interface 1007. Seat position sensor 1010 may receive data and seat position information used to determine the position of the seat of the user 250 which may be used to determine the position of user 250 within the vehicle.

FIG. 2 shows an illustration of a front view of a dashboard of a vehicle with a user 250 at the steering wheel, in accordance with some embodiments of the present disclosure. In some embodiments a camera 200 is positioned above the user or in any position in which the user 250 will be visible to camera 200 (e.g., near the vehicle's rearview mirror). In front of user 250 is a dashboard having a plurality of vents, 210, 220, 230, and 240 (e.g., as part of ventilation system 1011). The vents 210-240 route air into the passenger cabin of the vehicle. Movable fins or other controllable feature 210b, 220b direct the air from the vents in a selected direction. The fins are connected to a motor or other mechanism which controls and moves the fins. Processing circuitry, such as processing circuitry 1004, controls the mechanism of the fins (e.g., using an actuator). A vehicle of the present disclosure can include a number of vents 210-240 in different locations to direct air from various points, creating an atmospheric effect of the user feeling surrounded in a temperate environment from all sides.

In some embodiments, some (or all) of vents 210-240 may include fins to control direction of the airflow. For example, each vent may include fins that can control horizontal and vertical direction of the air flow. In some embodiments, the fins may be driven by at least one motor under control of the processing circuitry 1004. In some embodiments, the processing circuitry 1004 may control the directions of the fins or other controllable feature 210b, 220b as described above and below.

In some embodiments, the ventilation system 1011 may include four face duct routes from the ventilation system 1011 (e.g., a cooling system and heating system) to four outlets. In some embodiments, the vent system may include two foot duct routes from the ventilation system 1011 to two outlets in a footwell of the vehicle (e.g., one each side). In some embodiments, the ventilation system 1011 may include three defrost routes (e.g., one duct to the front glass, one duct to driver side glass, and one duct to passenger side glass). In some embodiments, the ventilation system 1011 may include valves to divert air into one or more of these duct routes. In some embodiments, vents 210-240 may have motorized moving controllable features 210b, 220b that are hidden from the users of the vehicle behind a fixed cage or grill. In some embodiments, each motor (e.g., actuator 210a, 220a) can be directed to go to a specific position, so airflow reaches a specific position.

In some embodiments, fins or other controllable features 210b, 220b of the vents 210-240 are motorized. For example, each vent may have a motor to control horizontal orientation of the fins, and one motor to control the vertical orientation of the fins (e.g. there may be eight total motors or actuators). For example, a motor can drive the fins to have vertical rotation angle of 40 degrees and horizontal rotation angle of 20 degrees to achieve an air direction target (e.g., direction selected via a touchscreen).

In some embodiments, the ventilation system 1011 may include an assembly for driving air to all other ducts (e.g., by operation of a compressor, a pump, a fan, or a vacuum). In some embodiments, the ventilation system 1011 may include several different vent ducts. For example, ventilation system 1011 may include several vent ducts for one or more vents. In some embodiments, the vehicle may include face ducts, foot ducts, ambient air duct, and windshield defrost duct. In some embodiments, the processing circuitry 1004 of the vehicle may control airflow from each of the ducts using a respective valve for each duct. For example, the processing circuitry 1004 may completely close a valve to stop all air flow, or partially open a valve to control the rate of the airflow. In some embodiments ducts may be closed based on occupancy of the vehicle which may be determined using deep learning models. In some embodiments, the processing circuitry 1004 of the vehicle may control airflow from each of the ducts using a respective blower motor or fan for each duct.

In some embodiments, air can be automatically fully turned off at each of vents 210-240 by turning the controllable feature 210b, 220b (using a motor) completely to the left, completely to the right, completely up, or completely down. In some embodiments, the ventilation system 1011 may be configured without valves (e.g., flow control valves described above), because air flow can be stopped and started at each valve outlet using the motorized fins.

In some embodiments, the ventilation system 1011 may not have dedicated ducts and outlets for side window defrost operations. Instead, side defrost functionality may be achieved by using motorized fins to control airflow from other air outlets toward the side windows. In some embodiments, the ventilation system 1011 may include an assembly configured to divert air for the purpose of performing side defrost operations while simultaneously preventing too much air being directed to the side window (e.g., at a detriment to other airflow). In some embodiments, any one (or several) of the face ducts, foot ducts, ambient air duct, and windshield defrost duct may be removed, while their functionality may be imitated by using motorized fins of other vents to control airflow in way that mimics the operation of the removed duct.

FIG. 3 shows an illustration of a display 310 of a vehicle, in accordance with some embodiments of the present disclosure. In some embodiments, display 310 is a touch screen or another user interface and input. In some embodiments, display 310 presents the user with preset options 320-370. Options may include, for example, Face Flyby 320 in which air is directed near the face of user 250 without touching it but rather touches the ears of user 250. Another option for example is the selection of body parts to which the user would like air directed, for example, "left ear and neck" as represented in option 330, "neck and head" as represented in preset option 340, or "neck and chest" as represented in preset option 350. Alternatively or in addition, preset options may include a profile which encompasses a user's saved preferences, such as Profile 1 360 and Profile 2 370. In some embodiments a user 250 may use more than one profile. For example, a user 250 may save a warm weather profile and a cold weather profile. In another embodiment, one profile may be associated with one driver while another profile is associated with another driver. In some embodiments, a user 250 may select the option he or she prefers. The system will then direct the vent or vents and corresponding airflow according to this selection. In some embodiments, the system may learn from collected data and predict patterns in a user's selection. For example, the system may suggest options, such as a cabin temperature in response a current weather forecast. In another example, the system may learn that the user of Profile 1 often adjusts a setting after a certain period of time and suggest or automatically perform the same adjustment when the period of time has passed. In some embodiments display 310 may show a user representation 380 of a user. In some embodiments, a user 250 may select a location on user representation 380 to direct air to. In some embodiments, the display 310 may illustrate a selected option on user representation 380 to confirm a selection. For example, if a user has selected "neck and head" the neck and head of use representation 380 may be highlighted on display 310. In some embodiments, a selection will apply to one or more users, e.g., the driver and front seat passenger. In some embodiments, selections may be user specific. In some embodiments air flow over the driver and the passenger may be controlled separately.

In some embodiments, display 310 may also be configured to receive a temperature selection. For example, the display 310 may show a temperature value which may be adjusted by the user via, for example, virtual temperature arrows 390 or a virtual dial. In some embodiments, the ventilation system 1011 may include a thermometer for determining the temperature of the vehicle cabin or of the user. In some embodiments, the temperature of the user may be determined based on information received from the camera 200. For example, the camera 200 may detect slight expansion of the user's face, indicating an increase in temperature. In some embodiments the ventilation system 1011 may adjust the temperature based on a determined temperature of the cabin or of the user 250. In some embodiments, the processing circuitry 1004 may adjust the temperature of air delivered via the air vent based on a temperature selection. For example, the processing circuitry 1004 may engage one of cooling system or heating system of the vehicle based on the selection. In some embodiments, the processing circuitry 1004 may also control valves of some or all of vents 210-240 to further control the temperature. In some embodiments the ventilation system 1011 may orient airflow based on the temperature of the vehicle cabin. For example, in some embodiments a user 250 may typically direct air flow to his or her body after getting inside of a vehicle that is uncomfortably warm but later direct the air flow away from his or her body once the user 250 becomes comfortable. This operation may be learned by the system so that air flow is automatically adjusted from one area of the user 250 to another area of the user 250 after a predetermined time. In some embodiments the ventilation system 1011 may direct airflow to the user 250 based on determining that the temperature of the vehicle cabin is uncomfortably warm and direct airflow away from the user 250 when it determines that the vehicle cabin is at a comfortable temperature.

Figure 4:
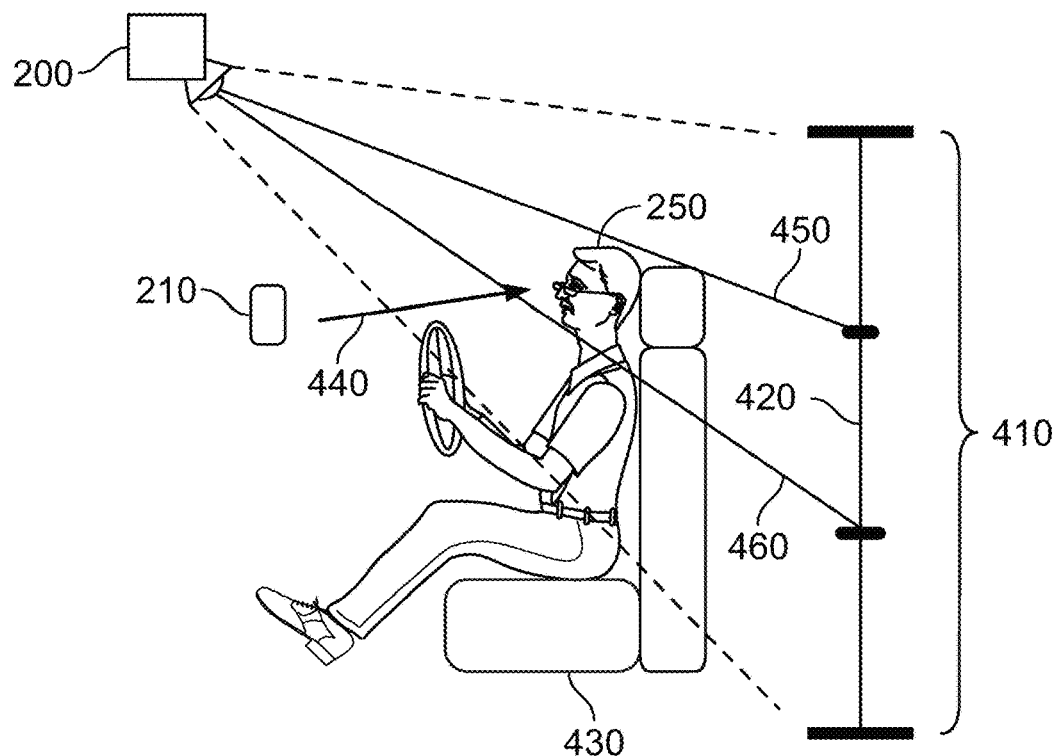
FIG. 4 shows an illustration of a side view of a user at the steering wheel of a vehicle, in accordance with some embodiments of the present disclosure.

FIG. 4 shows an illustration of a side view of a user 250 at the steering wheel of a vehicle, in accordance with some embodiments of the present disclosure. The user 250 is seated on adjustable vehicle seat 430. Camera 200 captures a two-dimensional image of the interior of the vehicle spanning a height and width, the height of the image being represented by line 410. In FIG. 4, the user 250 is in view of camera 200, further illustrated by the fact that the user 250 is within the height represented by line 410. The camera 200 captures body parts of user 250 within the image as well. Objects in the image have corresponding widths and heights, which correspond to regions of the image. For example, the user's head is in the image. The height and vertical location of the head of user 250 corresponds to segment 420, which is the segment between the points where the sightline 450 from the camera to the top of the head and the sightline 460 from the camera to the bottom of the head 460 reach line 410, as seen in FIG. 4. The system may use information from the captured image to position vent 210 to direct air flow 440 towards the user (e.g., toward the user's face).

Figure 5:
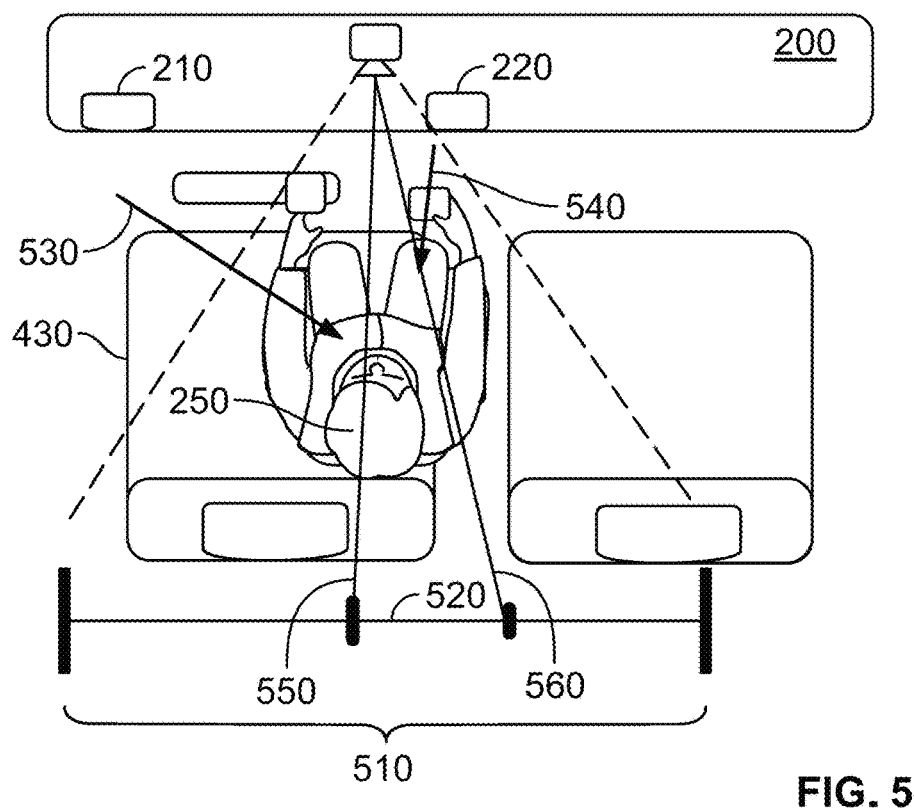
FIG. 5 shows an illustration of a bird's eye view of a user at the steering wheel of a vehicle, in accordance with some embodiments of the present disclosure.

FIG. 5 shows an illustration of a bird's eye view of a user 250 at the steering wheel of a vehicle, in accordance with some embodiments of the present disclosure. User 250 is leaning to the right side in this figure. Although the user 250 is not in a centered position, the system will still determine his or her position and the positions of his or her body parts that are relevant to any target direction the user 250 has selected. Camera 200 captures an image of the interior of the vehicle as discussed in the above paragraph. The width of the captured image is illustrated by line 510. As discussed above, objects within the image have a corresponding height and width, which correspond to regions in the image. The width and horizontal location of the head of user 250, for example, corresponds to segment 520, which is the segment between the points where the sightline 550 from the camera to the left edge of the head and the sightline 560 from the camera to the right edge of the head reach line 510. When the user 250 chooses to direct air to his or her head, for example, the system may use segments 420 and 520 (or the region corresponding to the segments) to locate the head of user 250 within the image camera 200 captures. The head location within the image may then be used to determine the position of the head within the vehicle. It may then use this information, along with the known locations of the vents, to control the vents, shown as elements 210 and 220 in FIG. 5, and direct air flows 530 and 540 toward the user's head, as requested by the user 250.

Figure 6:
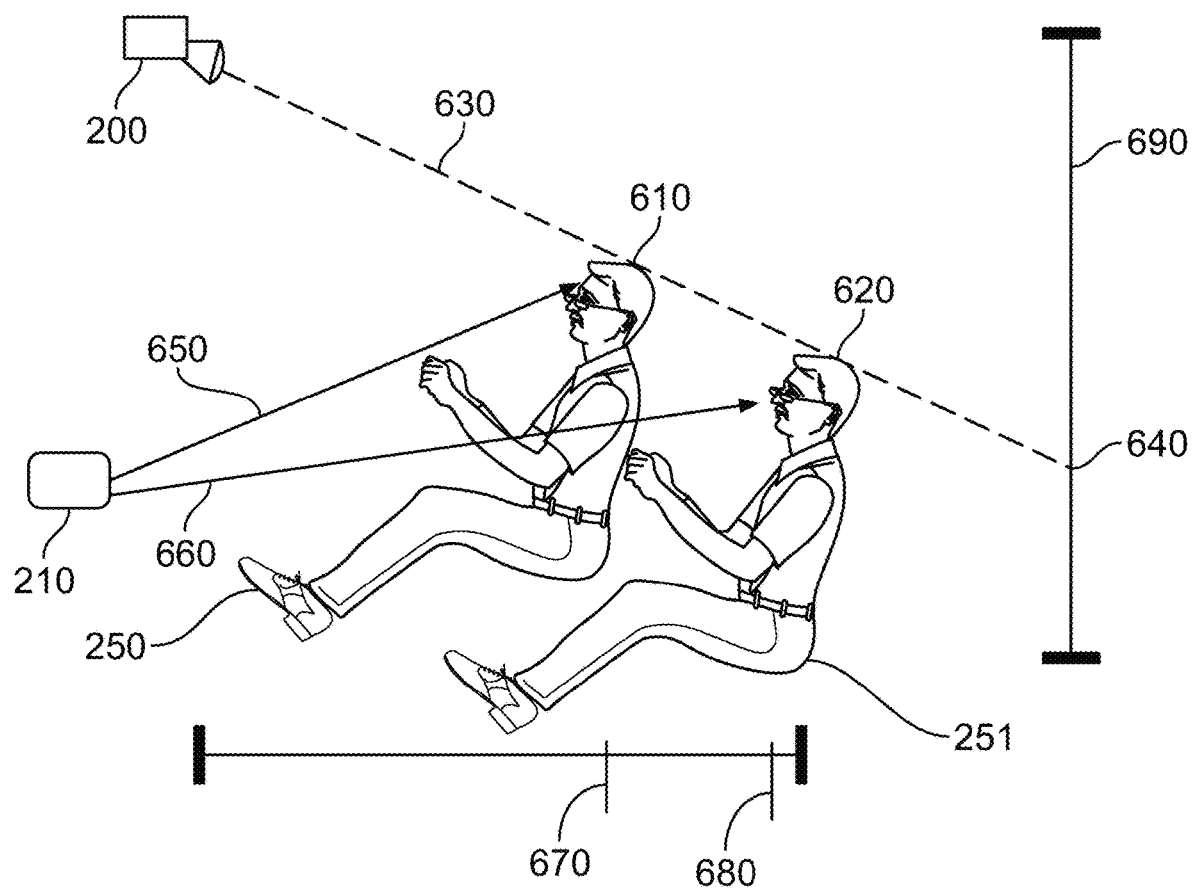
FIG. 6 shows an illustration of objects of different sizes captured by a camera.

FIG. 6 shows an illustration of objects of different sizes and positions captured by a camera 200, in accordance with some embodiments of the present disclosure. In some embodiments the position of the user 250 in the camera will depend on his or her distance from the camera 200. It should be noted that the image captured by camera 200 is a two-dimensional image of a matrix of pixels, having height and width, while the user 250 exists in three dimensional space having height, width, and depth. In some circumstances objects of different dimensions and positions may be represented identically in the captured image due to the image's two dimensional capture of three dimensional space, as illustrated in FIG. 6. The captured image represents light, e.g., diagonal line 630, received at the lens of camera 200, where light from different directions is represented by different pixels in the captured image. When two objects are in the same line of sight, they will be represented by the same pixel or pixels in the captured image. However the location of this pixel may not represent a single horizontal (or vertical) position in three dimension space. The system may take into account the depth of the object to inform the system of the location of the object in three dimensional space. For example, as indicated in FIG. 6 the center of object 610, in this example the head of a user 250, is captured along light direction 630 and represented by point 640 in the vertical component of the captured image 690. The center of object 620, in this example the head of a second user 251, is also captured along light direction 630 and is represented by point 640 in the vertical component of captured image 690 despite being lower than object 610 in three dimensional space. It should be noted that while the objects 610 and 620 are in the same line of sight relative to camera 200, the vent directions to the two objects are not identical as shown by vent direction 650, from vent 210 to object 610, and vent direction 660, from vent 210 to object 620. The variation in vent directions illustrates the importance of correctly and accurately determining an object's position. In some embodiments, the depth of the objects is used to determine their positions in three dimensional space. In some embodiments the system may rely on seat positions 670 and 680 to determine the position of objects and ultimately vent direction. The system may then calculate the horizontal (or vertical) locations of objects 610 and 620 in an image, and their positions in space, as a function of seat position 670, 680 and image region 640. In some embodiments the system may only estimate the depth of user 250 based on seat position 670. For example, it may estimate the user's depth relative to the seat position. In other embodiments the system may determine the size of a body part using a series of captured images of the body part and determine depth as a function of size, region, seat position, or a combination of these factors. Once the depth of user 250 is determined, the system may include this measurement to determine the three-dimensional position of user 250, which in turn is used to calculate how to control vent position to more accurately direct air streams. The system may incorporate depth in its calculation of location using principles of geometry, a look up table, or other applicable means. While FIG. 6 illustrates finding locations on the vertical axis, the same principles may be applied in the horizontal axis as well.

Figure 7:
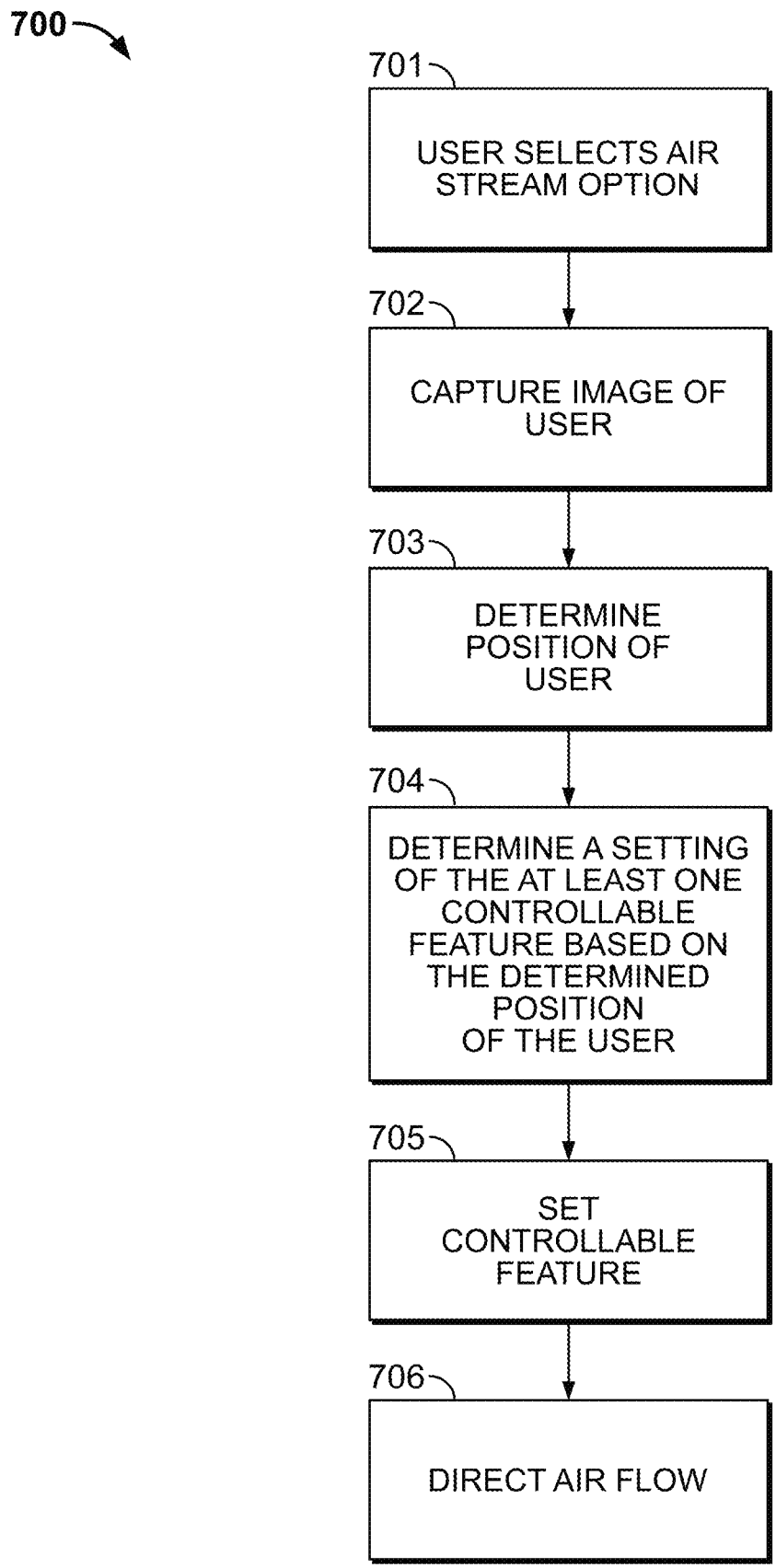
FIG. 7 shows a flowchart of a process for adjusting air stream based on a user selection.

FIG. 7 shows a flowchart of a process 700 for adjusting an air stream based on a user selection, in accordance with some embodiments of the present disclosure. One or more steps of process 700 may be executed by processing circuitry 1004 (e.g., by processor 1005) or other components of FIG. 1.

At step 701, a user 250 provides user input and selects an air stream option. The user 250 may select such an option using, for example, display 310. Air stream options may include, for example, body parts to which to direct the air stream, such as "Neck and Head" in option 340 seen in FIG. 3. Other options may be, for example, a user profile such as in option 360 in FIG. 3.

Once the user 250 has made a selection, process 700 proceeds to step 702. At step 702, an image or images of user 250 are captured, for example, using camera 200. At step 703, processing circuitry 1004 determines a position of the user 250. In doing so, the processing circuitry 1004 may analyze the image or images using, for example, image recognition software. In some embodiments, the processing circuitry 1004 determines positions relevant to the chosen option. For example, if the user 250 selected the "Neck and Head" option, the processing circuitry 1004 will determine the position of the neck and the head of the user 250 so that it may direct air streams towards those locations. The processing circuitry 1004 may determine relevant positions based on any of the techniques disclosed herein including locating facial or other location markers, estimating positions of the user 250 based on seat position, estimating positions of body parts based on a location of the user 250, deep learning, any other suitable technique, or a combination of techniques.

The processing circuitry 1004 may then calculate the location to which to direct air streams using the position of the user 250. At step 704, the processing circuitry 1004 determines a setting of a controllable feature (e.g., controllable features 210b and 220b) based on the determined position of the user. This step may include calculating the angles from the vents 210 and 220 that will direct air streams to the desired location. In some embodiments, the vents 210 and 220 include a fin or other mechanism to direct air flow or facilitate directional control of air flow. In some embodiments the vents 210 and 220 have corresponding actuators 210a and 220a, or motors, to direct the fins. In some embodiments, the processing circuitry 1004 calculates the necessary angles to which to position the fin or other mechanism based on the location determined in step 703. The system may calculate angles in each of the horizontal and vertical direction for each vent. Such calculations may be based on principles of geometry.

At step 705, the processing circuitry 1004 sets the controllable feature (e.g., controllable features 210b and 220b). This may be accomplished by instructing the actuators 210a and 220a, or other motors, to direct the fins or other control mechanisms of the vents 210 and 220 to the angles it has calculated in step 704. In some embodiments, this step receives input regarding a starting position of the fin and determines a change in position necessary to attain the calculated angle or angles of step 704. In some embodiments, this step may include connecting or disconnecting a vent from air flow as well.

At step 706, the processing circuitry 1004 directs the air stream. In some embodiments, this step involves blowing air through the vents 210 and 220. In some embodiments, this step also includes adjusting air stream temperature or speed based on what the user 250 has selected. In some embodiments, this step is adjusted after a given time interval to change the air flow direction to a different location. It will be understood that steps 701 through 706 may be repeated when the user 250 selects a new option. In addition, steps 702 through 706 may be repeated when the user 250 moves position so that the air stream is adjusted to accommodate the new position of user 250.

Figure 8:
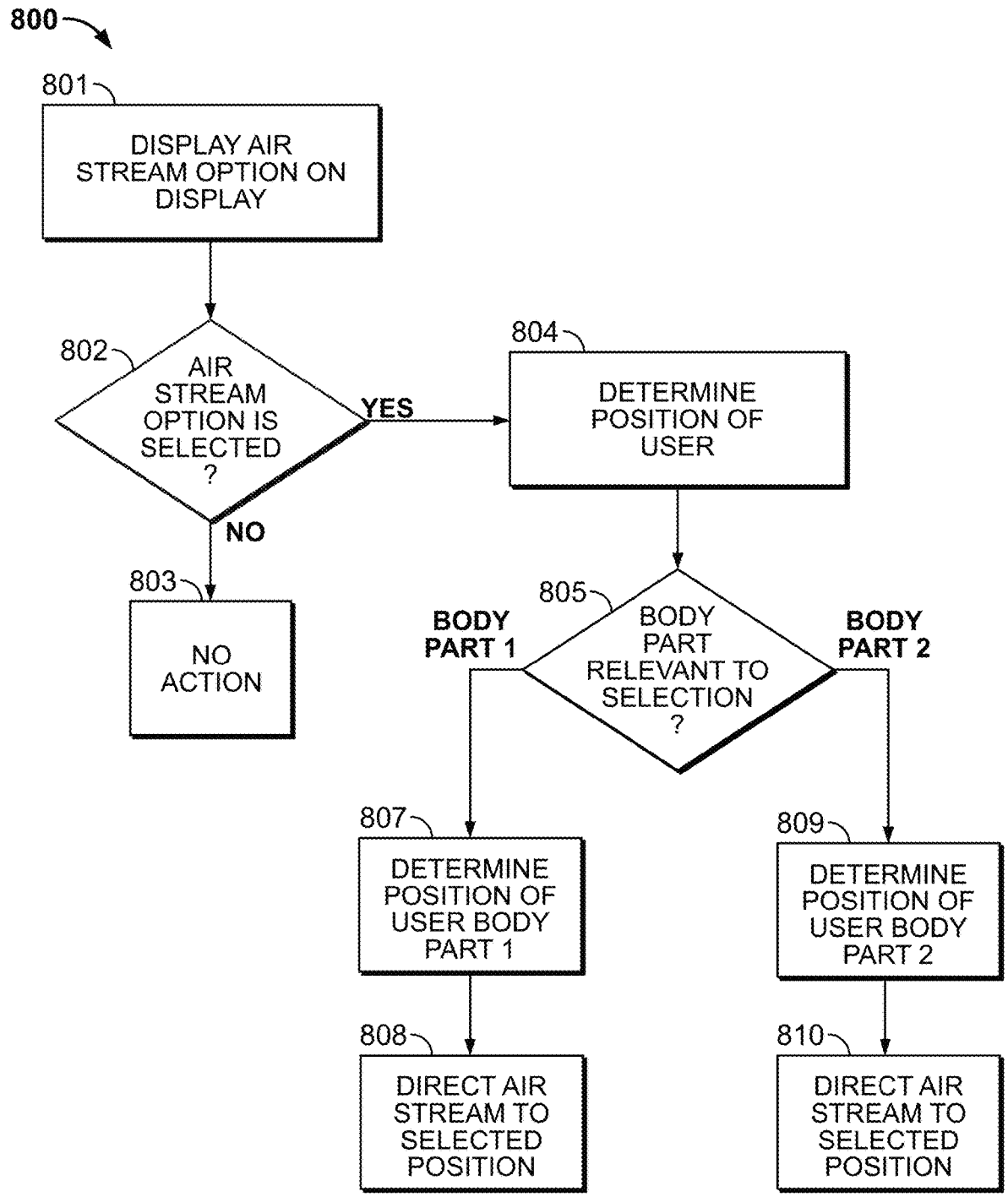
FIG. 8 shows a flowchart of a process for operating a ventilation system of a vehicle, in accordance with some embodiments of the present disclosure.

FIG. 8 shows a flowchart of a process 800 for operating a ventilation system 1011 of a vehicle (such as for example that of FIG. 2) and directing air in accordance with some embodiments of the disclosure. Process 800 may be executed by processing circuitry 1004 (e.g., by processor 1005) of FIG. 1.

At step 801 the processing circuitry 1004 may display at least one air stream option on a display. This air stream option may be, for example, an option representing where a user would like the air streams of the vents of the vehicle directed. For example, the air stream option may represent air directed to a user's face which, when selected, informs the system to direct air in that direction.

At step 802, the processing circuitry 1004 may receive an air stream selection from user input. In some embodiments, step 802 is performed in response to a user selecting an air steam option from display 310. In some embodiments, the display includes a user interface such as for example a touch screen. In some embodiments, a user may select the option he or she prefers and input that selection. If no air stream selection is received, process 800 proceeds to step 803 and no action is taken. If an air stream selection is received, process 800 proceeds to step 804.

Figure 9:
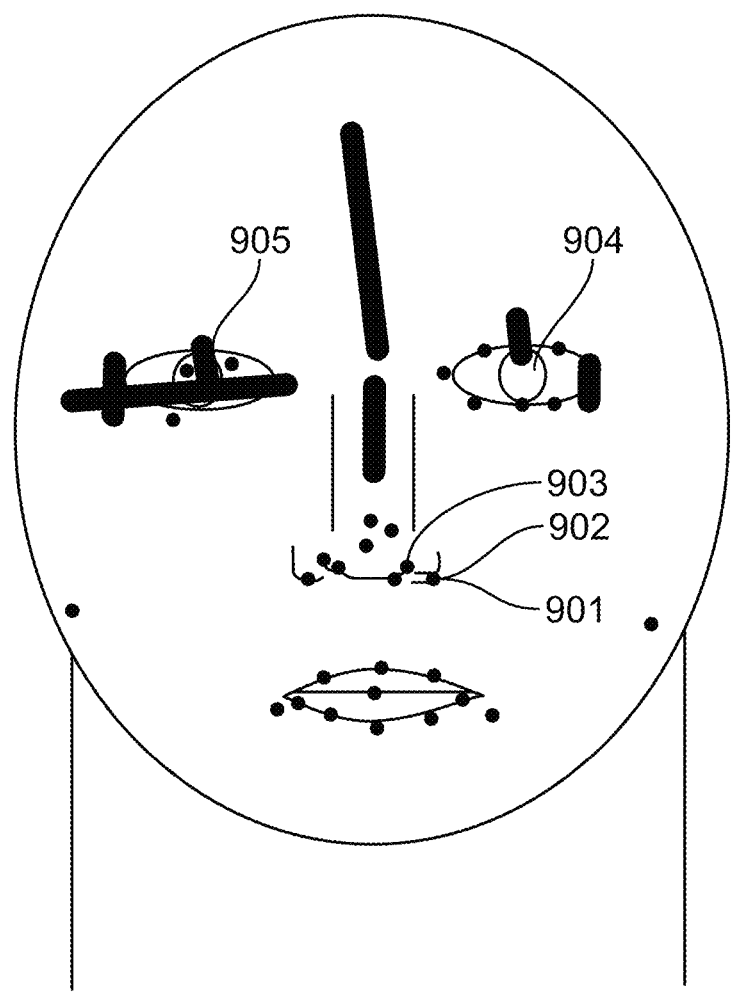
FIG. 9 shows an example of location markers in an image.

At step 804, the processing circuitry 1004 may determine a position of the user 250. In some embodiments the processing circuitry 1004 may do so based on receiving sensor data. The processing circuitry 1004 may, for example, determine a position of the user 250 based on images of the user captured from a camera that are processed using a computer vision algorithm. For example, as seen in FIGS. 4 and 5, camera 200 may capture images of user 250 seated in the vehicle. Camera 200 transmits the captured image to image processing software (e.g., implemented using processing circuitry 1004), which may analyze the image including finding location markers. Examples of such markers are shown in FIG. 9, including nostril markers 901, 902, and 903 and pupil markers 904 and 905. Using the location markers or other processing, the image processing software may determine the position of certain body parts such as eyes, ears, or head. In some embodiments location markers are not used and instead the positions of specific body parts are estimated. For example, the system may estimate that the head of user 250 is the top foot of the user 250. In other embodiments, the system may determine the position of a body part using location markers and estimating the relevant position of the body part based on the location markers. For example, the system may locate the pupils of the user 250 using location markers and estimate that the chest of the user 250 begins fifteen inches below the located pupils. The system might further consider the position of the user's seat or other data in determining the position of the user as discussed in connection with FIG. 6.

At step 805, the processing circuitry 1004 determines the body part relevant to the selection. A body part is relevant when the direction of the air stream, as selected at step 802, is affected by the position of the body part. For example, if a user chooses the air stream to be directed at his or her face, the user's face will be relevant to the selection because the position of the face will affect the direction of the air stream. Body part 1 may be any relevant body part such as, for example, face, eyes, ears, neck, or chest. If the system determines that body part 1 is relevant to the selection, process 800 will proceed to step 807 and determine the position of body part 1. In some embodiments, the position of the body part may be determined based on input from the camera and a computer vision algorithm. The system may incorporate a third party computer vision algorithm software or include proprietary computer vision elements. Some embodiments may include a combination of third party software and proprietary elements. In some embodiments, the position of the body part may be determined based on an estimate. For example, in a scenario where the system has located a part of user 250 in an image, it may determine the position of his or her head by estimating that the user's head is roughly the top foot of the user's image, as discussed above. In another embodiment, the system may estimate that the eyes of user 250 are at about the midway line of the head. The position of other body parts may similarly be determined based on estimated positions as well. In some embodiments, the system may rely on collected data and deep learning to determine location markers of a face or body part. In an example of deep learning, the system may process a collection of images of faces and determine locations of eyes, ears, mouths, or other facial features. It may then use this information to determine the location of the facial features on a new image of a face.

At step 808, the processing circuitry 1004 directs the air stream to the selected position relative to body part 1. In some embodiments, the processing circuitry 1004 configures fins, or other controllable features (e.g., controllable features 210b and 220b) of one or more vents to sequentially (or simultaneously) direct air from one or more vents to one or more locations selected at step 802. For example, where a user 250 has selected to have air directed to body part 1, for example his or her head, the processing circuitry 1004 will configure the fins to direct the air to body part 1. If the user 250 has selected the air to be directed at the edge of body part 1, for example, the edge of his or her head, the processing circuitry 1004 will configure the fins to direct the air to the edge of body part 1.

Steps 807-808 are performed as steps 809-810 when body part 2 is determined to be relevant at step 805. These steps may be repeated or performed for any number of body parts. As in steps 805-808, the process begins with step 805 where it determines whether or not a body part is relevant to the selection. If the body part is relevant, the process determines the position of the body part (e.g., at step 809) and directs air streams to the position of the body part or a position relative to the body part (e.g., at step 810).

It will be understood that process 800 is merely illustrative and that various changes can be made within the scope of the disclosure. For example, in some embodiments, the user may not input a selection at step 802. Instead the system may automatically direct air to a predetermined body part (e.g., the user's chest).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

What is claimed is:

1. A system for directing air, comprising:
an air vent system having at least one controllable feature configured to control a direction of air flow;
a sensor configured to detect a body part position; and
processing circuitry, coupled to the air vent system, configured to:
receive a user selection of an air stream option for a body part, from a plurality of air stream options for a plurality of body parts on a display;
determine a body part for a user that corresponds to the selected air stream option for the body part;
determine, based on data from the sensor, a position of the body part for the user;
determine a setting of the at least one controllable feature based on the determined position of the body part for the user; and
facilitate directional control of air flow via the at least one controllable feature based on the determined setting, wherein the air flow is directed toward the position of the body part for the user.

2. The system of claim 1, further comprising a camera configured to capture an image of the user;
wherein the processing circuitry is further configured to:
receive the captured image; and
determine the position of the body part for the user by identifying the user in the captured image.

3. The system of claim 1, further comprising:
a user interface, coupled to the processing circuitry, configured to receive a user input,
wherein the processing circuitry is further configured to set the at least one controllable feature based on the user input.

4. The system of claim 3, wherein the user input is a selection of a preset option.

5. The system of claim 4, wherein the preset option is a saved user profile.

6. The system of claim 1, wherein the processing circuitry is further configured to:

receive a temperature of the user; and
adjust a temperature of the air flow based on the temperature of the user.

7. The system of claim 1 further comprising:
an adjustable vehicle seat,
wherein the processing circuitry is further configured to:
  receive seat position information of the adjustable vehicle seat; and
  determine the position of the body part of the user further based on the seat position information.

8. A method for directing air, comprising:
receiving a user selection of an airstream option for a body part, from a plurality of airstream options for a plurality of body parts on a display;
determining a body part for a user that corresponds to the selected air stream option for the body part;
receiving sensor data from a sensor configured to detect a body part position;
determining, using processing circuitry, a position of the body part of the user based on the sensor data;
determining, using the processing circuitry, a setting of an air vent system based on the determined position of the body part for the user; and
directing, using the air vent system, air flow in a direction based on the determined setting, wherein the air flow is directed toward the position of the body part for the user.

9. The method of claim 8, further comprising:
capturing an image of the user using a camera, wherein the sensor data comprises the image,
wherein determining the position of the body part for the user comprises identifying the user in the sensor data.

10. The method of claim 8, further comprising:
receiving, using a user interface, a user input, wherein determining the setting of the air vent system is further based on the user input.

11. The method of claim 10, wherein the user input is a selection of a preset option.

12. The method of claim 11, wherein the preset option is a saved user profile.

13. The method of claim 8, further comprising:
receiving a temperature of the user; and
adjusting a temperature of the air flow based on the received temperature.

14. The method of claim 8, further comprising:
determining a position of an adjustable vehicle seat of the user,
wherein determining the setting of the air vent system is further based on the position of the adjustable vehicle seat.

15. A vehicle, comprising:
a HVAC system configured to provide conditioned air, the HVAC system comprising an air vent having at least one controllable feature configured to control direction of air flow;
a seat;
a user input interface configured to receive a user selection of an air stream option for a body part, from a plurality of air stream options for a plurality of body parts on a display:
a camera configured to capture a view of a user in the seat and configured to determine a body part for a user that corresponds to the selected air stream option for the body part; and
processing circuitry coupled to the user input interface configured to control a position of the at least one controllable feature to control the direction of air flow based on a determined position of the body part for the user.

16. The vehicle of claim 15, wherein the processing circuitry is configured to:
receive image data from the camera; and
determine the position of the body part for the user by identifying the user in the image data.

17. The vehicle of claim 15 further comprising:
wherein the processing circuitry is further configured to control the position of the at least one controllable feature based on a user input of a preset option received through the user interface.

* * * * *